Feb. 10, 1970 J. L. RIBOUR 3,495,195

AUTOMATIC FREQUENCY CONTROL SYSTEM

Filed Feb. 8, 1968 4 Sheets-Sheet 1

Inventor
JEAN L. RIBOUR
By Alfred C. Hill
Agent

AUTOMATIC FREQUENCY CONTROL SYSTEM

Filed Feb. 8, 1968 4 Sheets-Sheet 2

Inventor
JEAN L. RIBOUR
By Alfred C. Hill
Agent

AUTOMATIC FREQUENCY CONTROL SYSTEM

Filed Feb. 8, 1968 4 Sheets-Sheet 3

Inventor
JEAN L. RIBOUR
By Alfred C. Hill
Agent

Inventor
JEAN L. RIBOUR
By Alfred C. Hill
Agent

United States Patent Office 3,495,195
Patented Feb. 10, 1970

3,495,195

AUTOMATIC FREQUENCY CONTROL SYSTEM

Jean Louis Ribour, Boulogne-Billancourt, France, assignor to International Standard Electric Corporation, New York, N.Y., a corporation of Delaware Filed Feb. 8, 1968, Ser. No. 704,122
Claims priority, application France, Feb. 21, 1967, 95,775
Int. Cl. H03j 3/06
U.S. Cl. 334—15 10 Claims

ABSTRACT OF THE DISCLOSURE

A binary counter counts the output of a clock and a digital to analog converter coupled to all the stages of the counter produces a stepped frequency control signal to control the frequency of a frequency controlled circuit until a given frequency is achieved. A comparator coupled to the frequency controlled circuit and the first stage of the counter produces an output signal when the given frequency is achieved to reset the counter and thereby stop the production of the frequency control signal.

BACKGROUND OF THE INVENTION

This invention relates to an automatic tuning system for a frequency controlled circuit and more particularly to a digital automatic frequency control system.

It is unknown that the tuning of a frequency controlled circuit can be accomplished by employing variable reactances, such as voltage controlled variable capacitor diodes the value of the capacity of which is a function of the inverse voltage applied to the diode. In such arrangements, it is necessary to employ a polarizing voltage of a precision such that the elements used have a very high cost.

SUMMARY OF THE INVENTION

An object of the present invention is to provide an automatic frequency control system which has the advantage of being realized in an economic way.

Another object of the present invention is to provide an automatic frequency control system of the digital type.

A feature of this invention is the provision of an automatic frequency control system comprising first means to be frequency controlled to a given frequency; a binary counter having a plurality of cascade connected stages; a clock source coupled to the first stage of the counter to cause the counter to count the clock signal of the source; a digital to analog converter coupled to at least each stage of the counter and the first means to produce at least one frequency control signal as the counter counts to control the frequency of the first means; and second means coupled to the first means and the first stage of the counter to produce an output signal when the frequency of the first means equals the given frequency and stop the counting of the counter.

Another feature of this invention is the provision of the above mentioned second means which includes a high pass filter coupled to the output of the first means, a NOT circuit coupled to the output of the filter, and an AND gate having two inputs, one of the inputs being coupled to the output of the NOT circuit and the other of the inputs being coupled to the binary 1 output of the flip flop of the fist stage to produce the above mentioned output signal to stop counting of the counter.

Still another feature of this invention is the provision of the above mentioned second means which includes a high pass filter coupled to the output of the first means, a NOR gate having two inputs, one of the inputs being coupled to the clock source and the other of the inputs being coupled to the binary 0 output of the flip flop of the first state, and an AND gate having two inputs, one of the inputs being coupled to the output of the filter and the other of the inputs being coupled to the output of the NOR gate to produce the above mentioned output signal to stop the counting of the counter.

A further feature of this invention is the provision of the above mentioned second means which includes a high pass filter coupled to the output of the first means, an additional flip flop having a trigger input coupled to the output of the filter, a reset input, a binary 1 output to produce the output signal to stop the counting of the counter and a binary 0 output, and a NOR gate having two inputs and one output coupled to the reset input of the additional flip flop, one of the inputs of the NOR gate being coupled to the clock sources and the other of the inputs of the NOR gate being coupled to the binary 0 output of the flip flop of the first stage of the counter.

BRIEF DESCRIPTION OF THE DRAWING

The above-mentioned and other features and objects of this invention will become more apparent by reference to the following description taken in conjunction with the accompaning drawings, in which.

DESCRIPTION OF THE PREFERRED EMBODIMENTS

Figure 1:
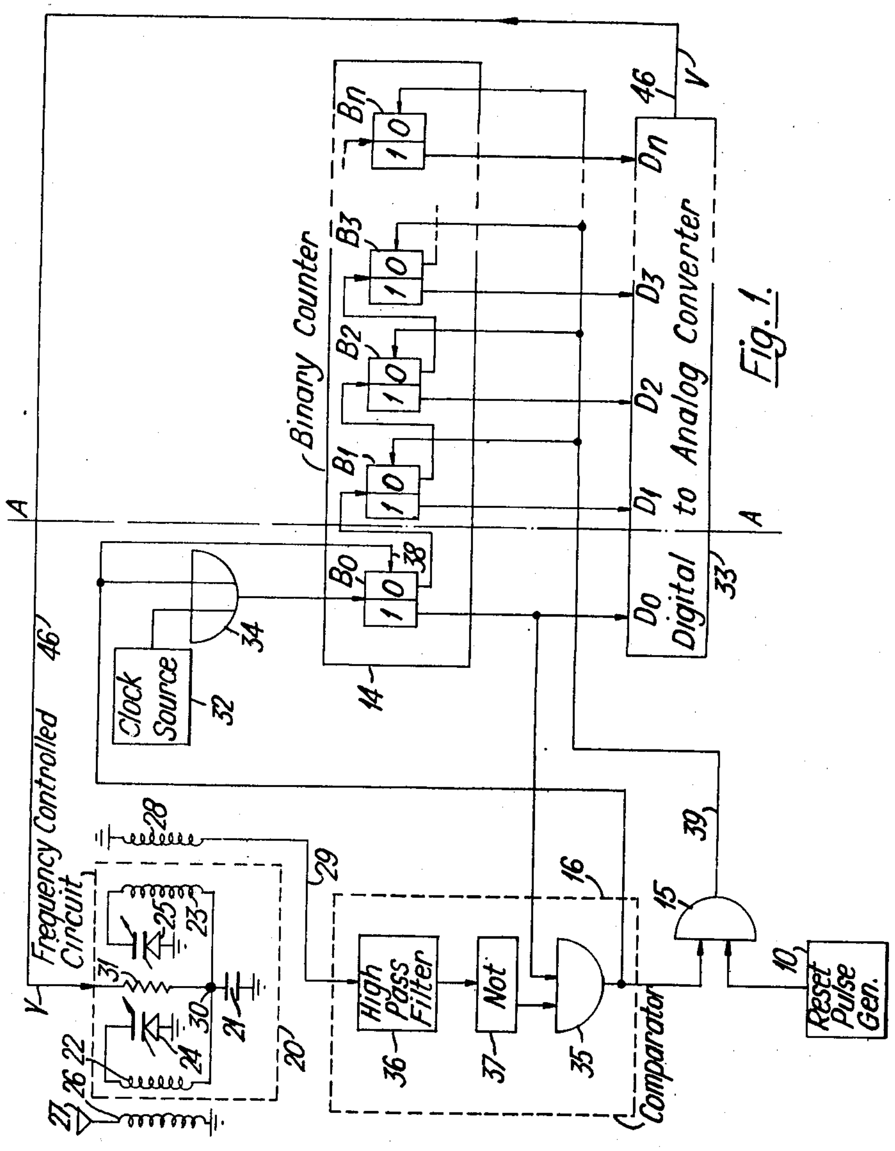
FIG. 1 is a block diagram of an automatic frequency control system in accordance with the principles of this invention.

Referring to FIG. 1, there is illustrated therein in schematic form one embodiment of a frequency controlled circuit 20 that may be employed with the automatic frequency control system of this invention. The particular frequency-controlled circuit illustrated is the input circuit of radio receiver which is to be tuned to a predetermined transmission frequency to be received. It is to be understood that this example of the frequency controlled circuit is for purposes of explanation and not as a limitation to the frequency controlled circuits that may be employed with the automatic frequency control system of this invention.

Figure 2:
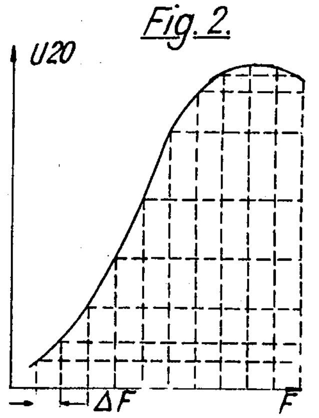
FIGS. 2 through 12 are curves useful in explaining the operation of the circuits of FIGS. 1, 13 and 14.
Figure 4:
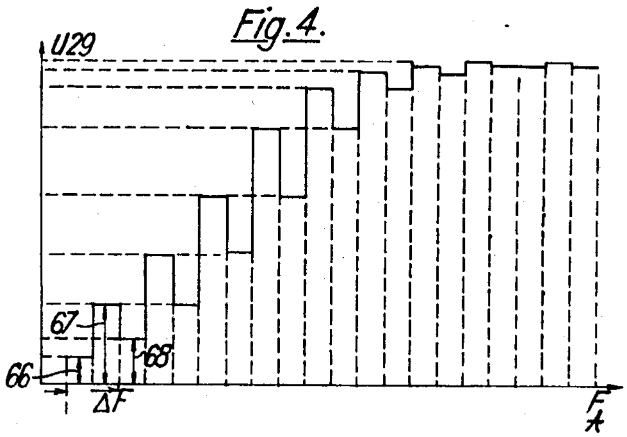
Figure 3:
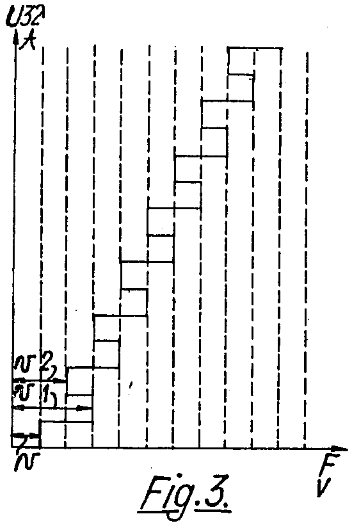

Frequency controlled circuit 20 comprises capacitor 21 connected to ground and to two windings 22 and 23 each of which are coupled to ground through two voltage variable capacitor diodes 24 and 25. Winding 22 is coupled to winding 26 which is connected at one terminal to ground and at the other terminal receiver antenna 27. Winding 23 is coupled to winding 28 which has one terminal connected to output conductor 29. The circuit 20 is, in fact, composed of two oscillating circuits closely coupled by capacitor 21 which also provides a storage or holding component for the frequency control signal applied to thereto. The inherent frequency of circuit 20 depends on the inverse voltage applied to diodes 24 and 25. FIG. 2 illustrates the frequency control or tuning characteristic of circuit 20. In the circuit illustrated frequency control voltage V as illustrated in FIG. 3 is applied to terminal 30 of capacitor 21 though resistor 31. The automatic frequency control can be obtained by taking advantage of the signals as illustrated in FIG. 4 delivered on output conductor 29 when the frequency control voltage V is varied.

Figures 5, 6, 7, 8, 9, 10, 11, 12:
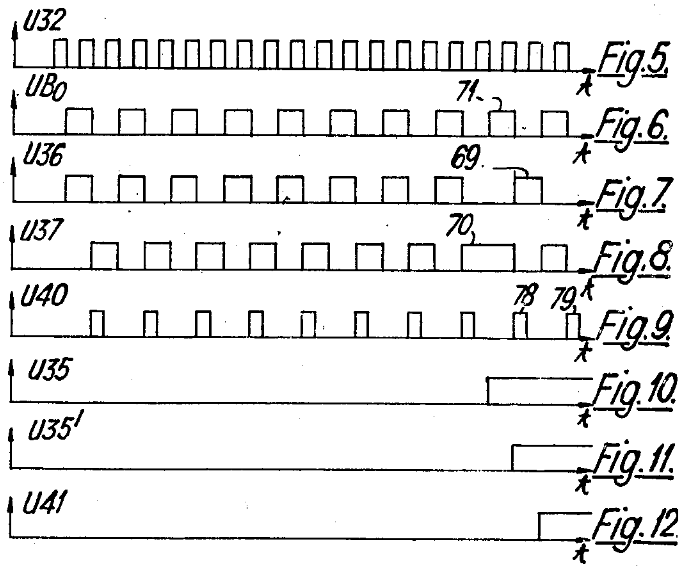

FIG. 1 illustrates one embodiment of the frequency control system of this invention which can be employed to control the frequency of circuit 20. Clock source 32 delivers a clock signal in pulse form which is illustrated in FIG. 5. The clock signal from source 32 is coupled through OR gate 34 to the trigger input of the first flip flop stage B*o* of binary converter 14 with the triggering thereof occurring on the negative transition of the clock pulse of FIG. 5. The 1 output of flip flop B*o* is coupled to the digital input D*o* of digital to analog converter 33. The signal on the 1 output of flip flop B*o* is illustrated in FIG. 6. The 0 output of flip flop B*o* is connected to the trigger input of the second flip flop B1. The 1 output of flip flop B1 is connected to the second digital input D1 of converter 33. Counter 14 comprises flip flop stages B2, B3 . . . B*n* connected in cascade like flip flops B*o* and B1. Each of the flip flop stages have the 1 output connected to the corresponding digital inputs D2, D3 . . . D*n*.

A comparator 16 is employed to compare the output signal of the frequency control circuit 20 (FIG. 4) and the output signal on the 1 output flip flop B*o* of counter 14 (FIG. 6). As illustrated in FIG. 1 comparator 16 includes high pass filter 36 connected to conductor 29 of circuit 20 and produces from the signal of FIG. 4 an output signal as illustrated in FIG. 7. The output of filter 36 is coupled to an inverter or NOT circuit 37 and produces an output signal as illustrated in FIG. 8. The output of NOT circuit 37 is coupled to one input of AND gate 35 while the other input of AND gate 35 is coupled to the 1 output of flip flop B*o*.

The output of AND gate 35 produces a signal indicating when the circuit 20 has been frequency controlled to the proper frequency by the output of converter 33 (FIG. 3) during the counting process of counter 14. By comparing the curves of FIG. 6 and FIG. 8 it will be observed that the two input signals to gate 35 are non-coincident and therefore gate 35 will not produce an output as illustrated in FIG. 10. However, when pulse 70 of FIG. 8 occurs there is coincidence between pulse 70 of FIG. 8 and pulse 71 of FIG. 6 thereby resulting in the activation of gate 35 to produce an output as illustrated in FIG. 10. When an output is produced from gate 35 this output is coupled to the reset terminal 38 of flip flop B*o* and also to the other input of OR gate 34 to thereby reset flip flop B*o*. After an output has been produced from gate 35 the other stages B1 to B*n* of counter 14 should also be reset by means well known in the art. FIG. 1 illustrates one of the many variations enabling the resetting of stages B1 to B*n*. This example includes AND gate 15 having one input coupled to the output of gate 35 and the other input coupled to reset pulse generator 10. When an output signal appears at the output of gate 35, gate 15 is activated and a pulse is applied from generator 10 to the reset terminal of stages B1 to B*n*. After the resetting operation is completed the automatic frequency control system is then ready to be activated again if necessary to return circuit 20 to the desired frequency, the desired frequency being maintained by the storage of the last value of the frequency control signal in capacitor 21 of circuit 20.

Figure 13:
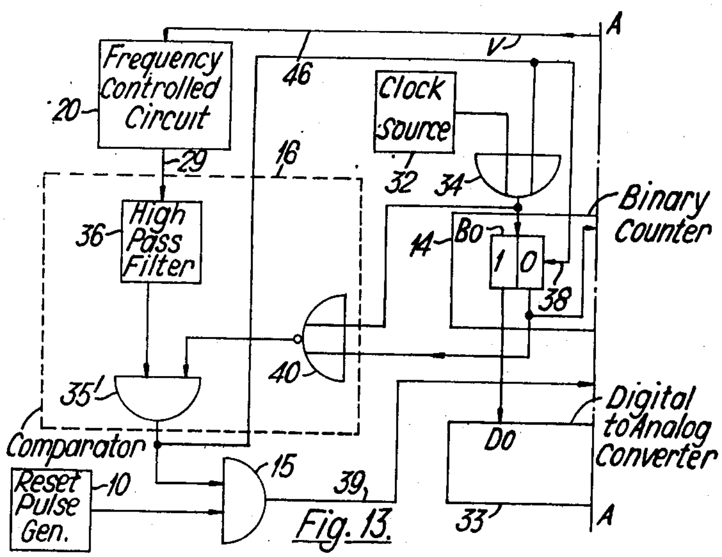
FIG. 13 is another embodiment of the components to the left of line A—A of FIG. 1, the components to the right of line A—A being identical to that illustrated in FIG. 1.

Referring to FIG. 13, there is illustrated therein components which may be substituted for the components to the left of line A—A of FIG. 1 representing another embodiment of comparator 16. Components identical to the components of FIG. 1 have applied thereto the same reference characteristic as employed in FIG. 1. Comparator 16 in the arrangement of FIG. 13 includes high pass filter 36 which filters the output signal of circuit 20 (FIG. 4) to produce the pulses of FIG. 7. The output of filter 36 is directly connected to one input of AND gate 35'. As in the arrangement of FIG. 1, clock signals from source 32 are coupled through OR gate 34 to the trigger input of the first stage flip flop B*o* of binary counter 14. As before the 1 output of this stage and the other stages of counter 14 are coupled to the digital inputs D*o* to D*n* of converter 33.

Returning now to comparator 16, it is observed that a NOR gate 40 has one input coupled to the output of OR gate 34 and the other input coupled to the 0 output of flip flop B*o* of counter 14 and produces an output signal as illustrated in FIG. 9. By comparing the signals of FIGS. 7 and 9, it is observed that the input signals to gate 35' are non-coincident up to the time that pulse 78 is produced at the output of gate 40 which is disposed in time coincidence with pulse 69 of FIG. 7. At this point in time gate 35' will produce an output as indicated in FIG. 11. Up to this time there has been no output from gate 35' due to the non-coincident relationship between the outputs of filter 36 and NOR gate 40.

In the arrangement of FIG. 13, flip flop B*o* is reset when an output is produced from gate 35' by coupling the output therefrom to the reset terminal 38 of flip flop B*o* and to the other input of AND gate 34. As in the case of FIG. 1, the other stages of counter 14 are reset after an output is delivered by gate 35' to stop the counting of counter 14 and, hence, the production of the frequency control signal at the output of converter 33. As mentioned, there are many ways that stages B1 to B*n* could be reset, one of these being illustrated in FIG. 13 which is identical to that illustrated in FIG. 1.

Figure 14:
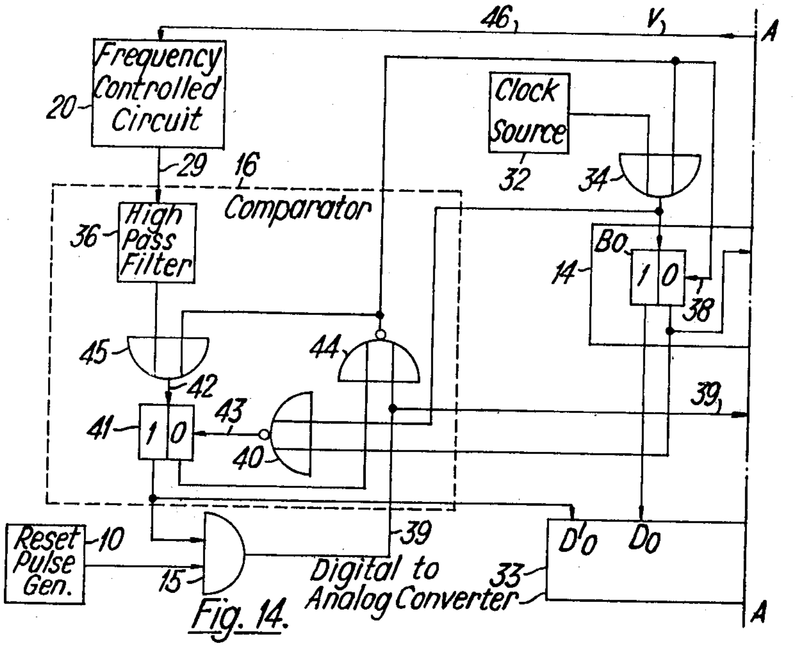
FIG. 14 is still another emodiment of the components to the left of line A—A of FIG. 1, the components to the right of line A—A being identical to that shown in FIG. 1.

Referring to FIG. 14, there is illustrated therein another embodiment of comparator 16 which performs the same function as in the arrangements of FIGS. 1 and 13, namely, to produce an output signal indicating that circuit 20 has been frequency controlled to the proper frequency.

As in FIGS. 1 and 13 the clock signal from source 32 (FIG. 5) is coupled through OR gate 34 to the trigger input of flip flop B*o* of counter 14. The 1 output of flip flops B*o* to B*n* are coupled to digital inputs D*o* to D*n* of converter 33.

Comparator 16 again employs high pass filter 36 coupled to conductor 29 at the output of circuit 20 producing the output as illustrated in FIG. 7. The output of filter 36 is coupled through OR gate 45 to trigger input 42 of flip flop 41. Flip flop 41 has its reset terminal 43 coupled to the output of NOR gate 40 whose inputs are coupled to the output of OR gate 34 and the 0 output of flip flop B*o*. By comparing FIGS. 7 and 9, it will be observed that the negative transition of the pulses of FIG. 7 attempt to trigger flip flop 41 but the time coincident positive transition at the output of gate 40 forces flip flop 41 to be reset. Thus, the negative transition at the output of filter 36 and the positive transition at the output of gate 40 cancel one another thereby leaving flip flop 41 in the reset condition. In other words, there is no output from the 1 output of flip flop 41 as illustrated in FIG. 12. Further comparison of FIGS. 7 and 9 indicate that the negative transition of pulse 69 of FIG. 7 appears in a non-coincident relationship with the positive transitions of pulses 78 and 79 at the output of gate 40 as illustrated in FIG. 9. Thus, flip flop 41 will be triggered to produce an output from its 1 output as illustrated in FIG. 12.

To reset the binary counter stages when there is an output from the 1 output of flip flop 41, NOR gate 44 is employed which has one input coupled to the 0 output of flip-flop 41 and one input coupled to conductor 39 at the output of AND gate 15, the switch circuit for reset pulse generator 10. Thus, when there is an output at the 1 output of flip flop 41, the output at the 0 output of flip flop 41 exhibits a negative transition resulting in a positive transition at the output of NOR gate 44 which is utilized to reset flip flop B*o* of counter 14 by means of terminal 38 and OR gate 34. The other stages of counter 14 are reset by the reset pulses contained on conductor 39 generated by activation AND gate 15.

OR gate 45 is an arrangement to avoid an untimely operation of the comparator following interferences capable of being detected by filter 36 whose second input is coupled to the output of NOR gate 44.

Where the converter 33 produces an output to tune two components of a frequency controlled circuit, the output 1 of flip flop 41 is coupled to a secondary digital input D*o*′ of converter 33.

Figure 15:
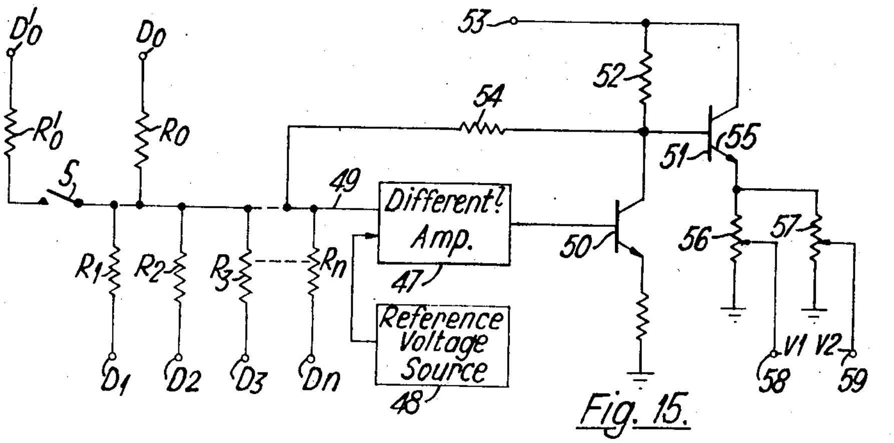
FIG. 15 is a schematic diagram of a digital to analog converter that can be employed in the system of FIGS 1, 13 and 14.

Referring to FIG. 15, there is illustrated one example of the circuit that can be employed for converter 33. Converter 33 is made up of a differential amplifier 47 having one of its inputs coupled to reference voltage source 48 which generates a fixed reference voltage. The other input 49 of amplifier 47 is connected in common to a plurality of resistances R*o*, R1, R2 . . . R*n*. The other terminals of these resistances provide the digital inputs D*o*, D1, D2 . . . D*n* of converter 33. The weights assigned to the inputs of converter 33 vary according to a predetermined progression starting from the input for the second flip flop, that is, input D1. The weight assigned to an input designates the value of the conductance of converter 33 when only the input considered is activated. An example of the progression that may be employed is a geometric progression of ratio two. Thus, if R designates the value of resistance R1, the value of the resistance R2, R3, R4 . . . are equal, respectively, to $R/2$, $R/4$, $R/8$ . . . .

The output of amplifier 47 is connected to transistor 50 of the NPN type, the emitter of which is connected to ground and the collector of which is connected to the base of a second transistor 51 of the NPN type. The polarizing of the base of transistor 51 is carried out by resistor 52 connected to terminal 53 of a constant current source feeding the frequency control system. Resistor 54 coupled between collector of transistor 50 and input 49 provides a counter balance effect. The collector of transistor 51 is connected to terminal 53 while emitter 55 is connected to ground through two potentiometers 56 and 57 connected in parallel. These potentiometers are preferable identical and their moving arms are connected to output terminals 58 and 59, respectively. These terminals form the analog outputs of converter 33.

Figure 16:
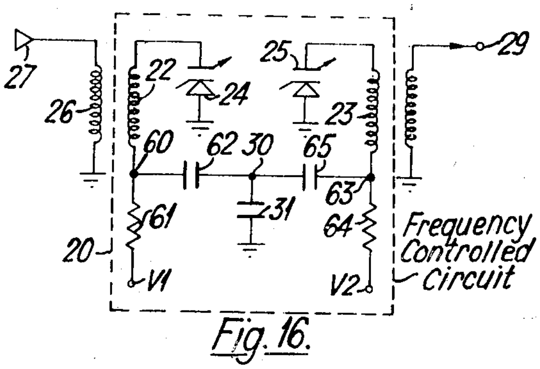
FIG. 16 is a schematic diagram illustrating another frequency controlled circuit that may be employed in conjunction with the systems of FIGS. 1, 13 and 14.

In the systems of FIGS. 1, 13 and 14, converter 33 presents a single analog output 46. This analog output on conductor 46 can deliver directly the voltage V inverted to control the frequency of the frequency control circuit 20. In the particular example of FIG. 15, converter 33 presents two analog outputs V1 and V2 at terminals 58 and 59 which are intended to allow a correct alignment of circuit 20 to be obtained in order to take account of the different tolerances of the normal values of the capacity of diodes 24 and 25. An example of such a frequency control circuit with two regulating voltages V1 and V2 is illustrated in FIG. 16. In this example, the first regulating voltage V1 is applied to diode 24 through winding 22 and resistor 61, terminal 60 being connected to terminal 30 of capacitor 31 through the decoupling capacitor 62. The second regulating voltage V2 is applied to diode 25 through the winding 23 and resistor 64, the terminal 63 being connected to terminal 30 through decoupling capacitor 65.

As pointed out hereinabove, the operation of the frequency control system of this invention is illustrated in FIGS. 2 through 12. There will be found hereinbelow a more detailed description of certain of these curves.

FIG. 2 illustrates the voltage U20 at the output of circuit 20 when its input receives a predetermined frequency and when the frequency of circuit 20 is varied by the application of voltage V from converter 33.

FIG. 3 illustrates the voltage present at the output of converter 33 as a function of the clock signal U32 which is itself proportional to the time *t*.

FIG. 4 illustrates voltage U29 appearing on conductor 29, the output of circuit 20, when the frequency of circuit 20 is made to vary by means of the automatic frequency control system of this invention.

When the frequency control system of this invention is in a state of rest, converter 33 delivers a residual polarizing voltage *v* as illustrated in FIG. 3. The value of *v* corresponds to an inherent frequency of circuit 20 and the latter is able to deliver an output voltage U29 of amplitude 66 as illustrated in FIG. 4.

At the end of the first pulse of the clock signal, that is at the time of the negative transition of this pulse, the first flip flop passes from the rest or reset state to the working or set state. The input D*o* of converter 33 is activated and converter 33 delivers a voltage having a value *v*1 as illustrated in FIG. 3. This voltage *v*1 produces at output 29 of circuit 20 the voltage 67 as illustrated in FIG. 4. At the time of the second pulse of the clock signal flip flop B1 is triggered to the set state while flip flop B*o* returns to the rest or reset condition. The input D1 is activated and the voltave *v*2 (FIG. 3) is applied to circuit 20 which delivers at the output thereof a voltage of amplitude 68 (FIG. 4). Being given that the weight assigned to the digital input D1 is less than the weight assigned to digital input D*o*, the voltage *v*2 delivered by converter 33 has an amplitude less than voltage *v*1. As a consequence the amplitude 68 of the output voltage U29 is less than the amplitude 67. This discontinuity is detected, extracted and formed into a pulse by high pass filter 36 which delivers at its output voltage U36 as shown in FIG. 7. Continuing from this point, the circuit of the various embodiments described herein operate as described in detail hereinabove with respect to FIGS. 5 through 12.

The precisions of the definition of the instant circuit 20 is tuned to the proper frequency depends upon the value of the frequency steps. In the example considered each frequency step has a value ΔF. It is quite clear that in using ΔF of smaller value, the definition of the instant proper tuning is achieved will be more precise.

Figure 17:
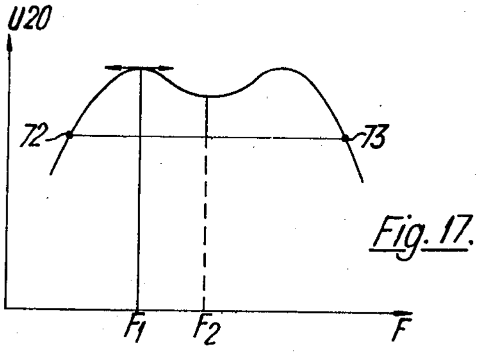
FIG. 17 illustrates another example of the frequency control or tuning characteristic of the frequency controlled circuit of FIG. 16.

In the case of a loose, or with several peaks, tuning characteristic, such as that shown in FIG. 17, the proper tuning will be obtained on frequency F1 corresponding to the first peak of the tuning characteristic. In reality the frequency on which an oscillating circuit should be tuned is frequency F2. To obtain this frequency F2, the value of the weight assigned to the input D*o* corresponding to the first flip flop is adjusted. For example, there can be given to this weight the value of the weight corresponding to a further frequency step far removed from the step considered, the difference between the indices of these two steps being, for example, equal to eight. The resistance R*o* of FIG. 15 is then equal to $R/8$. Thus, the disagreement between the frequency of the pulses of the signal UB*o* (FIG. 6) and the frequency of the pulses of the signal U36 (FIG. 7) will be produced upon the comparison of the amplitudes 72 and 73 of the tuning characteristic. The position of frequency F2 in relation to the amplitudes 72 and 73 is determined experimentally and from it is determined the value of the polarizing voltage which should be delivered by converter 33. To this value of the polarizing voltage corresponds a predetermined weight. This weight is defined by a supplementary resistor R′*o* coupled to input 49 of amplifier 47 of the circuit of FIG. 15 when switch S is crossed. One terminal of this supplementary resistor R′*o* is the supplementary digital input D′*o* to which the 1 output of flip flop 41 of FIG. 14 is coupled. This resistance R′*o* is required to be put into service when flip flop 41 or AND gates 35 and 35′ provide an output indicating proper tuning is achieved. Thus, the digital input D′*o* is connected to the output of comparator 16, that is, to the 1 output of flip flop 41 in the embodiment illustrated in FIG. 14.

When the frequency control system is reset and the tuning of the frequency control circuit is as desired, the setting into service of the frequency control system can be carried out by an independent control effecting simultaneously the start of the clock signal source and the return to zero of counter 14.

While I have described above the principles of my invention in connection with specific apparatus, it is to be clearly understood that this description is made only by way of example and not as a limitation to the scope of my invention as set forth in the objects thereof and in the accompanying claims.

I claim:

1. An automatic frequency control system comprising:
first means to be frequency controller to a given frequency;
a binary counter having a plurality of cascade connected stages;
a clock source coupled to the first stage of said counter to cause said counter to count the clock signal of said source;
a digital to analog converter coupled to at least each stage of said counter and said first means to produce at least one frequency control signal as said counter counts to control the frequency of said first means; and
second means coupled to said first means and the first stage of said counter to produce an output signal when the frequency of said first means equals said given frequency and stops the counting of said counter.

2. A system according to claim 1, wherein
each stage of said counter includes a flip flop having a binary 1 output and a binary 0 output; and
said converter is coupled to said binary 1 output of each of said stages.

3. A system according to claim 2, wherein
said second means includes
a high pass filter coupled to the output of said first means,
a NOT circuit coupled to the output of said filter, and
an AND gate having two inputs, one of said inputs being coupled to the output of said NOT circuit and the other of said inputs being coupled to said binary 1 output of said flip flop of said first stage to produce said output signal.

4. A system according to claim 3, further including
means coupled between the output of said AND gate and at least said flip flop of said first stage to reset at least said flip flop of said first stage to stop the counting of said counter.

5. A system according to claim 2, wherein
said second means includes a high pass filter coupled to the output of said first means,
a NOR gate having two inputs, one of said inputs being coupled to said source and the other of said inputs being coupled to said binary 0 output of said flip flop of said first stage, and
an AND gate having two inputs, one of said inputs being coupled to the output of said filter and the other of said inputs being coupled to the output of said NOR gate to produce said output signal.

6. A system according to claim 5, further including
means coupled between the output of said AND gate and at least said flip flop of said first stage to reset at least said flip flop of said first stage to stop the counting of said counter.

7. A system according to claim 2, wherein
said second means includes
a high pass filter coupled to the output of said first means,
an additional flip flop having a trigger input coupled to the output of said filter, a reset input, a binary 1 output to produce said output signal and a binary 0 output, and
a first NOR gate having two inputs and one output coupled to said reset input, one of said inputs being coupled to said source and the other of said inputs being coupled to said binary 0 output of said flip flop of said first stage.

8. A system according to claim 1, wherein
said binary 1 output of said additional flip flop is coupled to said converter.

9. A system according to claim 8, further including
a reset pulse generator, and
a second NOR gate having two inputs, one of said inputs being coupled to said binary 0 output of said additional flip flop and the other of said input being coupled to said generator when said output signal is produced, and an output coupled to at least said flip flop of said first stage to reset at least said flip flop of said first stage to stop the counting of said counter.

10. A system according to claim 9, further including
an OR gate having an output coupled to said trigger input of said additional flip flop and two inputs, one of said inputs being coupled to the output of said filter and the other of said inputs being coupled to said output of said second NOR gate.

References Cited

UNITED STATES PATENTS 3,411,103 11/1968 Deman et al. ---------- 331—14

JOHN KOMINSKI, Primary Examiner

U.S. Cl. X.R.

325—335, 422; 331—14, 18, 178